United States Patent [19]
Fuller

[11] Patent Number: 5,143,200
[45] Date of Patent: Sep. 1, 1992

[54] GUIDE WALL MODULE FOR ORDERING APPARATUS HAVING ROTATOR WALLS

[76] Inventor: Stuart C. Fuller, Rte. 2, Box 55, Goode, Va. 24556

[21] Appl. No.: 726,078

[22] Filed: Jul. 5, 1991

[51] Int. Cl.$^5$ ............................................. B65G 47/12
[52] U.S. Cl. .................................... 198/453; 198/454
[58] Field of Search ............... 198/453, 454, 455, 448; 193/35 R

[56] References Cited

U.S. PATENT DOCUMENTS

| | | | |
|---|---|---|---|
| 3,310,151 | 3/1967 | Carter | 198/453 X |
| 3,628,647 | 12/1971 | Beard | 198/454 |
| 3,862,680 | 1/1975 | Johnson | 198/454 |
| 3,934,706 | 1/1976 | Tice | 198/454 |
| 4,236,625 | 12/1980 | Smith et al. | 198/454 |
| 4,962,843 | 10/1990 | Ouellette | 198/454 X |
| 4,976,343 | 12/1990 | Fuller | 198/453 |

Primary Examiner—Robert P. Olszewski
Assistant Examiner—Cheryl L. Gastineau

[57] ABSTRACT

A guide wall for ordering apparatus for ordering a flow of randomly arranged cylindrical articles into a single file having a guide wall module composed of a plurality of rotators arranged for rotation on axles having ends extending beyond the rotator array and disposed in substantially vertical stands of superimposed rotators the module featuring a frame formed in a U-configuration having a base and facing sides extending outwardly from the base, the facing sides supporting the array therebetween at a point sufficiently far from the base to allow free rotation of the rotators; the facing sides having opposed facing longitudinal channels slidably receiving and retaining bearing mounts for supporting the axle ends of the array.

16 Claims, 5 Drawing Sheets

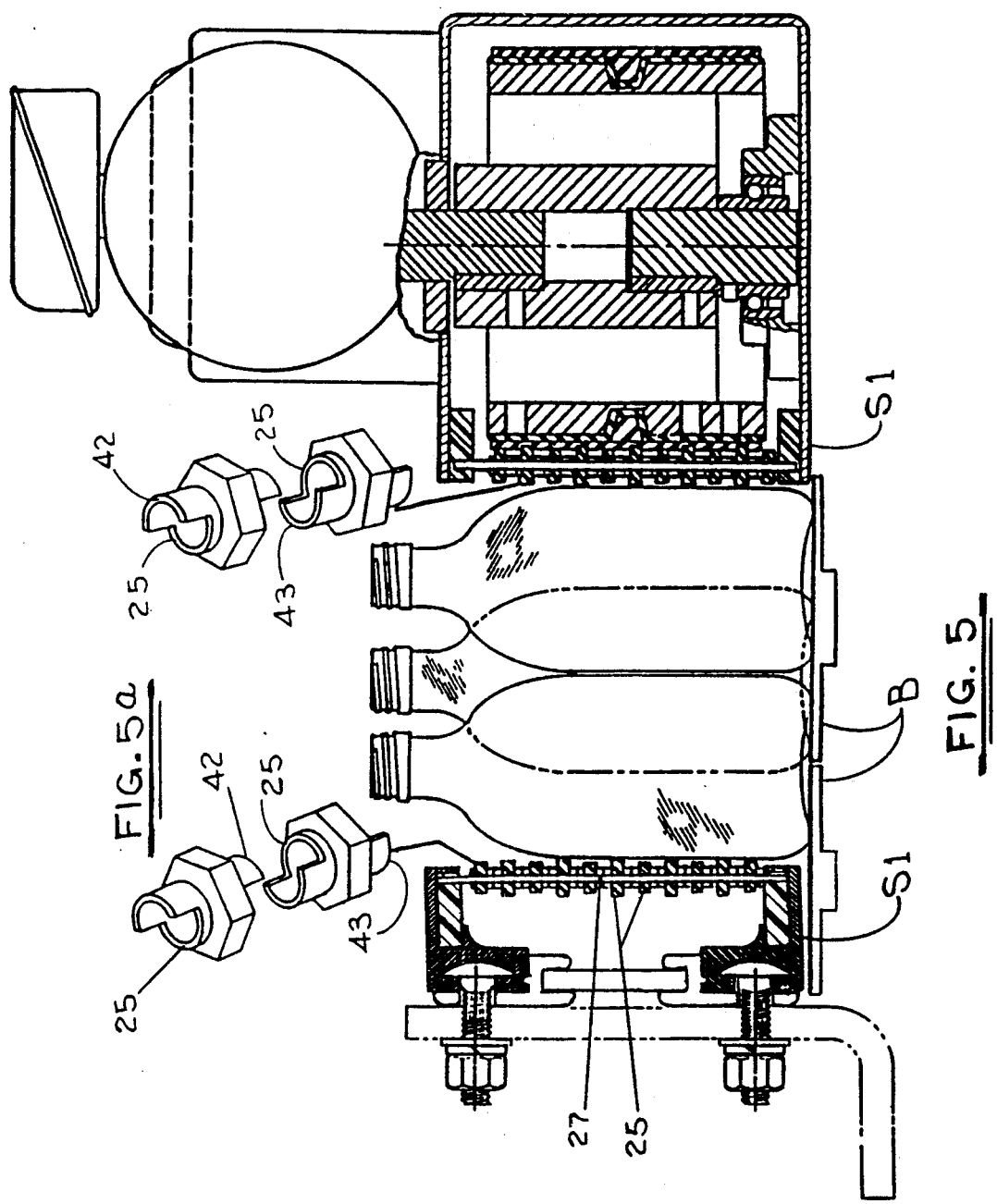

GUIDE WALL MODULE FOR ORDERING APPARATUS HAVING ROTATOR WALLS

BACKGROUND OF THE INVENTION

In a wide spectrum of highly automated industries around the world, large volumes of cylindrical articles such as containers with relatively rigid side walls in constant flow have to be rearranged and ordered into a single file in a continuous flow. An ongoing need exists to efficiently single file these cylindrical articles for filling or packaging or other action such as inspecting, packaging, washing, rinsing, filling, labeling or capping within as small a working area as possible. Examples of these are the container manufacturers for and the actual end producers of the Food, Beverage, Brewery, Pharmaceutical, Oil and Paint Industries. The containers are of glass, plastic, metal (aluminum or steel), or composite. Automotive and like or related industries using assembly line techniques similarly require ordering of cylindrical pistons and other cylindrical parts for handling in automated systems in large quantities in their various assembling and machining processes.

In order to maximize a high degree of operating efficiency on these conveyor lines, a surge or accumulation area between each section of processing equipment is desirable, because momentary or intermittent disruptions in the feed in a production line would otherwise means that within seconds each section of upstream process equipment would have to shut down. Without reserve areas of accumulation between each section, the entire production line would have to stop and start frequently, thus reducing the efficiency of the entire production operation.

Following each of these surge or accumulation areas, it is necessary to order the articles into a single file, in order to feed the articles to the next piece of downstream equipment. Many types of ordering systems have been proposed for this purpose.

Tice U.S. Pat. No. 36934,706, patented Jan. 27, 1976, provides an apparatus for channeling a disorderly array of articles that are being transported on a conveyor into a uniform single row of articles. The apparatus includes a pair of spaced articles confining walls. The walls converge towards each other in a direction corresponding to the flow of the articles. One of the walls has a plurality of longitudinally spaced vertically extending rows of beads provided thereon for engaging the disorderly aray of articles as they pass therethrough and force such into single file while minimizing jamming. These beads are rotatably supported, so that as the articles of the disorderly array engage the beads while being moved forward on the conveyor, the beads tend to rotate, permitting the articles to be moved through the narrow end of the spaced walls without jamming. The wall with the beads thereon can be referred to as a live wall and takes the overall configuration of an abacus.

Beard U.S. Pat. No. 3,628,647partented Dec. 21, 1971, provides an article combiner which arranges a plurality of articles advancing abrease in tandem relation to form a single row thereof without appreciably interfering with forward movement of the articles or their natural tendency to nest or move into tandem relation.

Converging guide means are provided for smoothly guiding a plurality of articles advancing abreat into a single row, with means being provided for quickly and effectively dislodging articles from a jam-up, should one occur.

Referring to FIG. 1, the terminal end portion of the first conveyor 12 and the beginning portion of the conveyor 13 from a part of the article combiner, which also includes first and second guid means 14, 15 which are disposed in converging relation above and adjacent to these portions of first conveyor 12 and second conveyor 13.

First guide means 14 includes agitating means 16 for agitating articles brought into contact therewith to free the articles from any jammed condition, and to facilitate arrangement thereof in tandem relation without apreciably interfering with forward movement thereof along the predetermined path of travel. Agitating means 16 comprises a bank of freely rotatable rollers 17 mounted for rotation about generally vertical axes extending parallel to the articles being conveyed by the conveyors. Rollers 17 are arranged in vertically extending rows and, as illustrated, there are three rollers in each row, with the rollers of adjacent rows being staggered relative to each other and with their adjacent peripheral portion overlapping.

First guide means 14 also includes buffer means 30 normally maintaining articles out of contact with agitating means 16, so as normally not to permit agitating means 16 to appreciably interface with the natural tendency of the articles to nest or move into tandem relation, but permitting contact of the articles with the agitating means 16 upon a predetermined resistance to further forward movement of certain articles, as upon a jam-up of articles between the first and second guide means, such that the agitating means 16 may agitate these articles and free them from any such jammed condition. As illustrated, buffer means 30 comprises a pair of vertically spaced-apart guide bars 31 preferably formed of nonscarring, friction-reducing material.

These devices have only limited success in accomplishing their task. The live wall of spherical beads of U.S. Pat. No. 3,934,706 actually does very little turning as the cylindrical articles pass by, and even when they do turn, there is no additional give or moment of mvoement resulting from the turning, due to their spherical shape. The same is true of the turning of the round rollers of U.S. Pat. No. 3,628,647. Even if the round rollers do turn upon tangential contact of the cylindrical articles, there would be no additional give or moment of movement resulting that would further encourage the cylindrical objects to slip by one another.

The only real give or agitating movement of the cylindrical articles as they are forced along the path of the guide walls made up of spherical beads or round rollers is the in and out movement caused by the peaks and valleys of the staggered rows of spherical beads or round rollers. This does, however, offer some improvement over the solid low-friction wall of that portion of U.S. Pat. No. 3,310,151. These types of solid low-friction shallow inclusive angle converging rails are most often very long, which also requires additional lengths of very costly horizontal conveyor components. Most often, however, many production plants do not have enough floor space to allow adequate single file room for these flat (7° or less) inclusive angle rails.

Since the 1970's there has been a substantial increase in the speed and number of cylindrical articles that flow per unit time through the production lines of the previously mentioned industries. As an example, in a single high speed brewery filling line, as many as 2,200 can per minute are produced. This has exacerbated the ordering problem, to single file the cylindrical articles, and there is in fact no ordering and combining apparatus available today that is capable of satisfactory performance at such high speeds.

Fuller U.S. Pat. No. 4,976,343, patented Dec. 11, 1990, provides apparatus for ordering a flow of randomly arrangled cylindrical articles into a single file, featuring an article conveyor having guide walls composed of a plurality of polygonal rotators arranged in substantially vertical stands in superimposed rotating relationship, the rotators having substantially straight side walls joined together at corners with angles between 60° and 150°, and preferably oriented to each other in the stand in nonaligned relation with corners projecting outwardly beyond side walls of other rotators in the stand, thereby imparting a rotational and vibrational movement to articles in contact with the rotators.

U.S. Pat. No. 4,962,843, to Ouellette, patented Oct. 16, 1990, provides ordering appartus with combiner rails for installation on opposite sides fo a container-transporting conveyor system. The function of the combiner rails is to reduce a relatively wide span of multiple containers to a single row or file of the containers. Each combiner rail has a plurality of sets of rollers. Each roller set is supported by a channel in a horizontal row and several channels are stacked one above the other. The axes of the rollers in one horizontal channel are staggered from the axis of the rollers in the immediately adjacent horizontal channel. This arrangement is accomplished by providing channels which may be extruded for supporting each horizontal row of shafts and longitudinally offsetting the channels as desired. Because of these off-set roller axes, the gaps between adjacent rollers in any given horizontal row are staggered from the gaps in an adjacent horizontal row. The overall effect is to practically eliminate the gap or recess between rollers that has prevailed therefore.

The mounting of an array of rotators such as rollers or rotators so as to constitute a side wall of such rollers or rotators in a position to contact containers on a conveyor in such ordering apparatus has always been a special problem. Individual rollers or totators break or become distorted and have to be replaced. The axles on which they are mounted can bend under the stress of a jam-up, and have to be replaced. This usually required dismantling of the wall, and the shutdown can be prolonged as this can be complicated and time-consuming.

The present invention provides a simple construction for such a wall module tht eliminates screws, nuts and bolts, and gives access to the rotators or rollers by way of sliding bearing mounts carrying the bearing tips or ends of the axles on which the rotators or rollers are supported. The bearing mounts slide on and off the module frame, and when off are loose, and can be pulled off the axle ends for replacement of the rollers or rotators and/or axles.

SUMMARY OF THE INVENTION

In accordance with the present invention, a guide wall is provided for ordering apparatus that is capable of operating at high speed for ordering a flow of randomly arranged cylindrical articals into a single file and leading to an article single file portion of the apparatus, comprising:

(1) an array composed of:
   (i) a plurality of rotators;
   (ii) arranged for rotation on axles having ends extending beyond the rotator array thereon;
   (iii) the arrays being disposed in substantially vertical stands of superimposed rotators:
   (iv) the rotators preferably beijng polygonal and so oriented to each other in the stand that edges of some rotators project outwardly beyond side walls of other rotators in the stand for operative contact with cylindrical articles on the conveyor surface; where by rotating polygonal rotators in the stands upon contact with cylindrical articles impart a vibrational movement to these articles while the articles are rotating and so inhibit jamming and blockages while the articles are moved and ordered into the single file;

(2) a frame formed in a U-configuration having a base and facing sides extending outwardly from the base, the facing sides being sufficiently spaced apart to receive and retain the array therebetween at a point sufficiently far from the base to allow free rotation of the rotators;
   (i) facing sides having opposed facing longitudinal channels slidably receiving and retaining bearing mounts for supporting the axle ends of the array;
   (ii) the base having mounting means for attaching the wall module to the ordering apparatus as a wall thereof in a position of contact cylindrical articles on the conveyor surface.

In a preferred embodiment, the base also has at least one and usually two longitudinal channels in a position for attachment of the base to the ordering apparatus, slidably receiving retaining members carrying the mounting means for the attachment. Such retaining members can be slid to any location along these channels to accommodate the ordering apparatus to which they are attached.

The drawings show preferred embodiments of the invention.

FIG. 5 is a cross sectional view of the wall nodule of FIG. 1;

FIG. 5A is an enlarged exploded view of two polygonal rotator sets of the wall module of FIG. 5.

Figure 1:
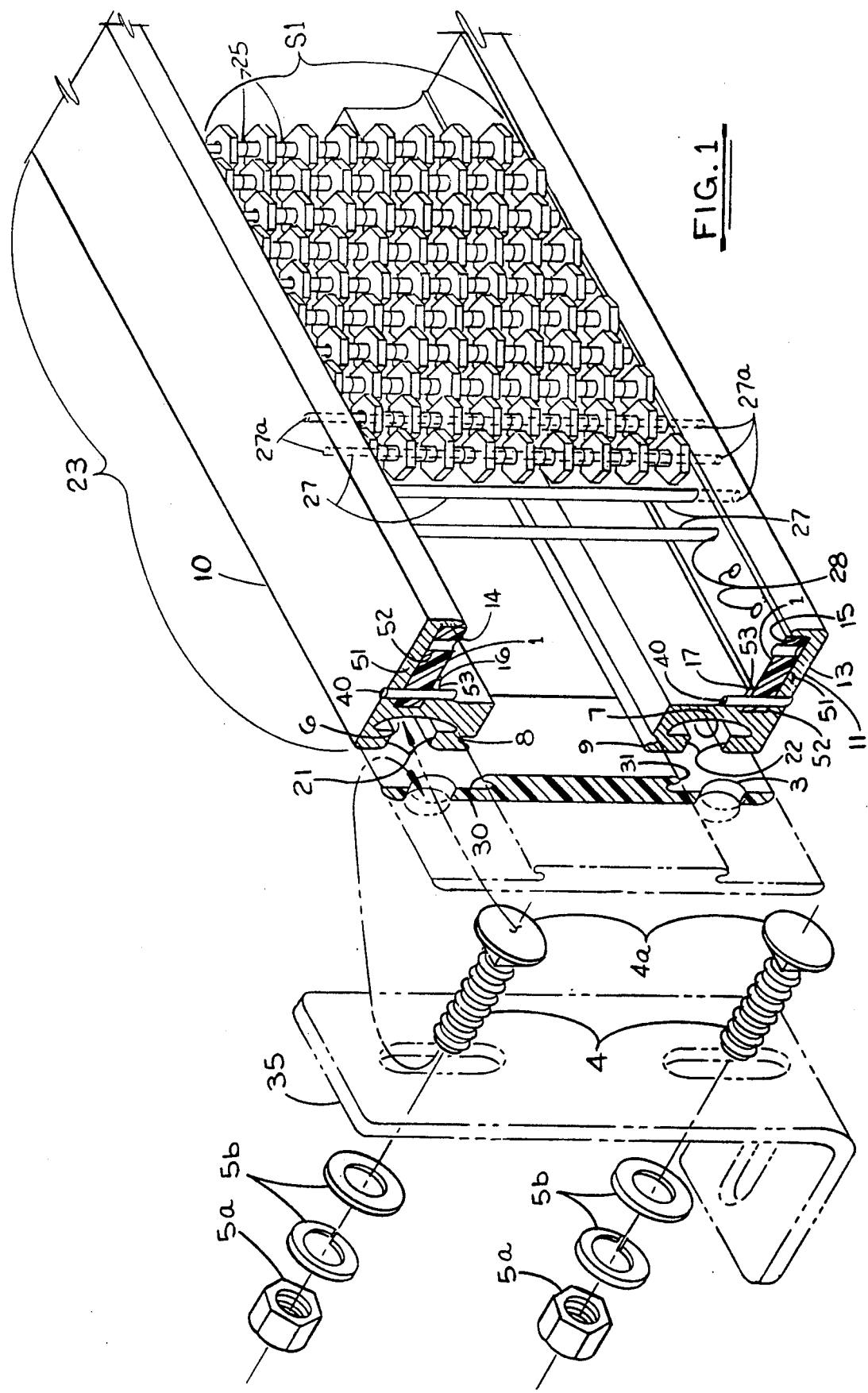
FIG. 1 is an exploded view of a wall module of this invention, provided with polygonal rotators.

The rotators can be of any external configuration, such as polygonal, spherical, or cylindrical. If polygonal, they can be for example triagonal, tetragonal, square, pentagonal, hexagonal, heptagonal, octagonal, nonagonal or decagonal. As the number of sides in the polygon increases, so does the angle of the side walls at the corners, and the extent of the projection correspondingly decreases. Indeed, the polygon also more closely approaches the circular configuration of a cylinder, with no corners at all, which is undesirable, since a cylinder does not impart an effective mechanical thrusting effect to the articles it contacts. Thus, to maintain an effective mechanical thrusting effect in the stand, the angles at the corners of the polygons should be between about 60° and about 150°, and preferably are from about 60° to about 120°. An important contribution to the effectiveness of the rotators arises from a nonaligned arrangement in the guide wall stands, with the edges of some rotators aligned with and projecting outwardly from sides of other rotators in the stand.

The rotators in a stand or array are mounted for rotation on a substantially vertical shaft or axle on which they rotate in a substantially horizontal plane. Adjacent rotators in a stand can be individually mounted, unattached to each other, or attached to each other in groups or throughout the stand, but preferably they are simply placed on the shaft or axle in abutting relationship, and are not only rotatable on or with the shaft but also are free to move up and down along the shaft, either individually or in groups, or throughout the stand. This up and down movement facilitates inhibiting jam-ups or breaking up jam-ups wherever they occur.

To make possible rotatable mounting of the rotators on a shaft or axle in a stand, while permitting up-and-down movement of rotators, and at the same time keying the rotators in a stand in the desired orientation with respect to each other, so that corners project outwardly beyond side walls of other rotators in the stand, the rotators can be provided with specially shaped hub portions, with a central aperture for the shaft, and special contour of the portion facing the hub portion of the next adjacent oppositely-oriented rotator, as described in U.S. Pat. No. 4,976,343, the disclosure of which is hereby incorporated by reference. See especially FIGS. 1A, 1B, 1C, 1D, 2A, 2B, 2C and 2D.

The plurality of rotators composing the stands have a height and diameter selected according to the height of the guide walls required by the height of the cylindrical articles and their diameter. If the articles are regular from top to bottom, all of the rotators can be of the same height and diameter. For ordering articles wide at the bottom and narrow at the top, such as bottles, the stands can have wider rotators at the top to ensure contact with the narrow necks of the bottles. Other variations will be apparent, such as to accommodate articles with constrictions between top and bottom portions, like pinch bottles.

A polygonal hexagon rotator having $\frac{1}{2}$ inch long straight sides is the optimum size for use with the most commonly encountered size of cylindrical articles in today's food, beverage and brewery industries. This corresponds to a 0.568 inch long diametral diagonal between opposite corners of the hexagon, considering a further size reduction caused by a 1/32 inch radius on each corner. Thus, the perimeter circumference around this hexagon is 3.14×0.568 inch or 1.78 inch. The optimum effective range of ratios polygonal rotator diameter: the cylindrical article diameter is from 1:3 to 1:8 for a polygon of 0.568 inch diameter the cylindrical article diameter can range from about 1.70 to about 4.54 inches.

For a given diameter or size of polygonal rotator as the number of sides decreases and the enclosed angle decreases, the size or diameter of the cylindrical articles that can be ordered by such rotators increases. For example, the diameter of a nominal mid-range cylindrical article that can be ordered by a regular hexagonal rotator with a perimeter circumferential diameter of 0.568 inch is 5.5×0.568 or 3.124 inches in diameter. (The 5.5 is the mid-range of the 1:3, 1:5.5, 1:8 ratio range.) As the diameter of a further example, a nominal mid-range cylindrical article that can be ordered by pentagonal rotator with an identical perimeter circumference or diameter is 3.124 inches ×1.1 or 3.44 inches. For a square rotator, it is 3.44×1.1 or 3.78 inches.

Preferred size relationships between polygonal rotators and cylindrical articles can also be shown by graphs, as illustrated by U.S. Pat. No. 4,976,343.

The stands are made up of individual rotators preferably assembled in such as way that edges or corners of some rotators project outwardly from sides of other rotators. The projections can be centered on the sides, or offset towards one corner. If one orientation be considered as A, and B be considered as another, it will be seen that if the polygons of the stand are the same, corners of the B set will project from sides of the A set, and corners of the A set will project from sides of the B set. The rotators can be arranged in rows in the pattern ABABAB, etc. with alternating rotators of each orientation, or with several rotation of each orientation together, as AABBAABB, etc., or irregularly, as AABB-BAABBAAABB, etc. The precise arrangement selected depends upon the configuration of the articles, as will be apparent.

The rotators in the stand are held in the selected orientation by any conventional means. As shown in U.S. Pat. No. 4,976,343, the rotators can be provided with facing surfaces configured to mate with or keyed with the surfaces of adjacent rotators, so as to lock them together; when this expedient is used, the rotators can be free to move up and down, independently, on the shafts. If all or some of the rotators can be attached together, for movement en masse, they can for example be bonded together by an adhesive, or by welding or fusing.

The walls module frame is in a U-shape, with opposed facing sides extending from a based in a spacing sufficient to carry therebetween the arrays of rotators at a location sufficiently far from the base to allow free rotation of the rotators.

The facing sides have opposed facing longitudinal channels slidably retaining the bearing mounts for the arrays of rotators. The bearing mounts have bearing sockets receiving the projecting tips or ends of the rotator axles. The axis ends can be fixed in the sockets in a press-fit, or by bonding, if the rotators rotate on the axles. If the rotators are fixed on the axles, and rotator and axle rotate together, as when driven, the bearing mounts are of material that will resist wear from rotating axles, such as nylon or polytetrafluoroethylene (Teflon) or polychlorotrifluoroethylene (Kel-F). Lubrication can also be provided to the bearing sockets, if desired.

The base can also and in a preferred embodiment does have longitudinal channels slidably supporting the mounting means for attaching the wall module to the ordering apparatus. The slidable mounting means can for example have recessed apertures for nuts and bolts or screws for this attachment, which is conventional.

Figure 2:
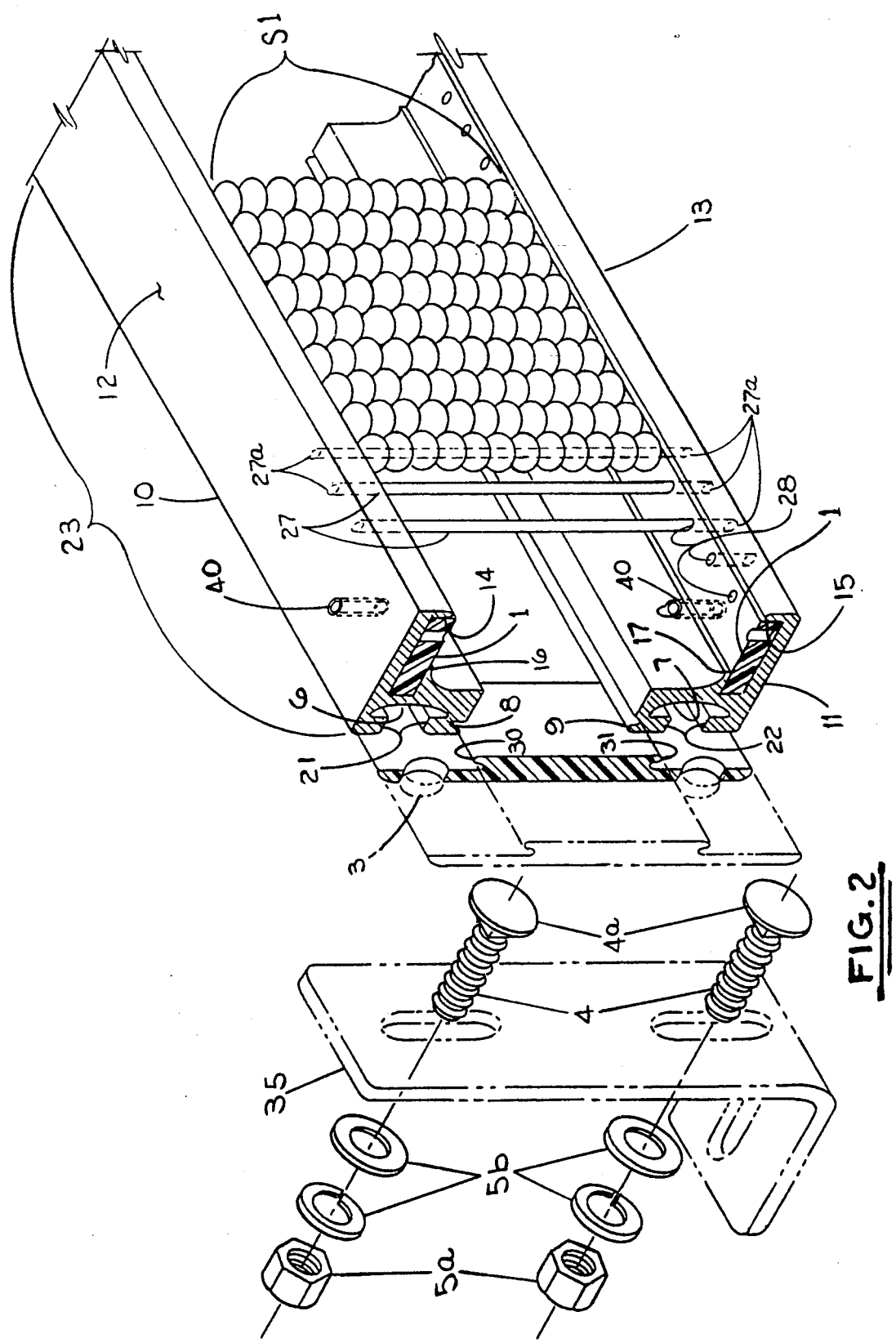
FIG. 2 is an exploded view of a wall module provided with rotatable spheres as the rotators.
Figure 3:
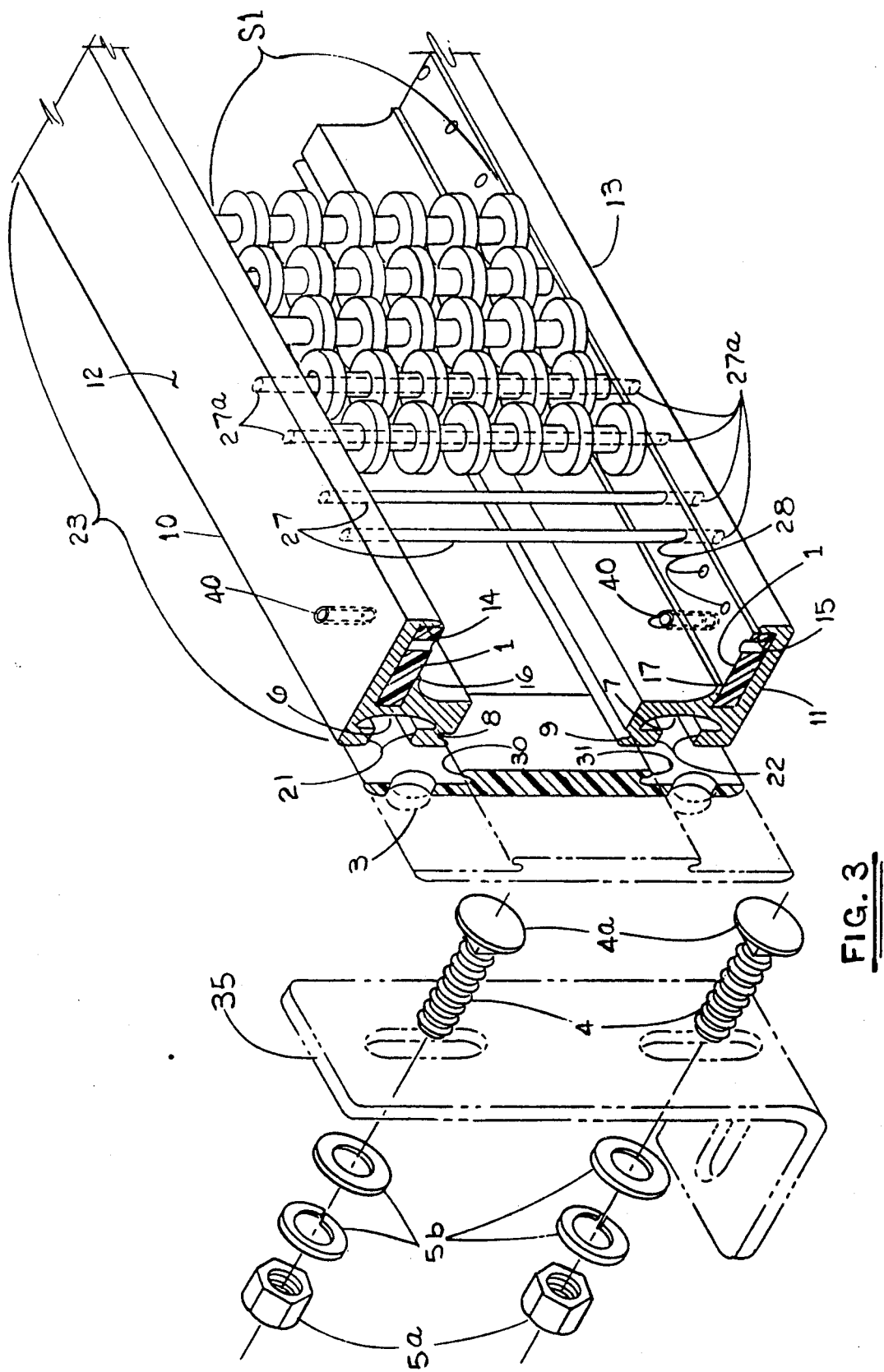
FIG. 3 is an exploded view of a wall module provided with cylindrical rollers as the rotators.

In this embodiment, the base can be in two sections, each section including one facing side as a part of one base section, so that each facing side is on a separate base section, held together as one module by a third base section, as seen in FIGS. 1, 2 and 3. In this case, a variable height, arrangement and orientation of the rotators can be attained by forming the facing side of each section to suit the desired dimensions, and modifying the rotators and axle lengths accordingly.

The frame is best made of metal or plastic, formed in the desired configuration, including channels and grooves, by extrusion or molding in continuous and infinite lengths. Aluminum and stainless steel are preferred metals for use in the food industry. Nylon, Teflon, Kel-F, polyvinyl chloride, polycarbonate, polyethylene, polypropylene, polyesters, synthetic rubber, and polyoxymethylene are exemplary plastics.

DESCRIPTION OF A PREFERRED EMBODIMENT

The preceding general description is exemplified by the embodiments shown in FIGS. 1 to 5a of the drawings.

These FIGS. each illustrate a wall module for an ordering apparatus such as that shown in U.S. Pat. No. 4,976,343, FIGS. 3 to 7, a depalletizer which feeds cylindrical bottles or similar articles from loading area A to an accumulation or collection area B. This bulk depalletizer has a motor driven conveyor 2, and is capable of feeding up to 2,200 bottles per minute into the production system. The bottles are moved by the bulk depalletizer from area A onto a three-belt cross conveyor into area B. The collection area B has restraining walls which confine the bottles as they are moved to the left by the conveyors and thus are forced into the convergent area C to order themselves into a single file at D. Within portions of these areas C and D are positioned guide walls modules 23 as seen in FIGS. 1 to 5a, in accordance with the invention, made up of stands S1 of driven and of freely rotatable rotators, polygonal in FIG. 1, spherical in FIG. 2, and cylindrical in FIG. 3. The stands are rotated by a power source (not shown) or are not driven but are freely rotatable, as desired.

As seen in FIGS. 1, 5 and 5a, the stands S1 in the wall module 23 have polygonal rotators with hubs 25 of the type of FIG. 1, of U.S. Pat. No. 4,976,343 with central apertures through which pass the shafts 27, with the rotators held thereon by mating flanges 42, 43 in the orientation shown in the Figure. The rotators are molded from a low friction polyacetal (long wear life) non-abrasive plastic, optionally with the corners of the rotators rounded. The shaft ends 27a are fixedly held in bearing sockets 28 in the bearing mount in a press fit. The mounts are made from an ultra high molecular weight polyethylene plastic material.

Each of the wall modules of FIGS. 1 to 3 have the same basic three-section frame construction. The frame 9 of each module 23 has two base sections 10, 11 each with one facing side 12, 13, extending outwardly at right angles to the base. The sides 12, 13 are formed with longitudinal opposed and facing channels 14, 15, corresponding in configuration to bearing mounts 1, and in which the mounts are slidably retained by flanges 16, 17. In this way the rotator array S1 is held on the base of the module frame, but is easily dismantled for replacement of rotators on the individual shafts 27 simply by sliding the mounts 1 out of channels 16, 17 and lifting them off the shaft ends 27a. Re-assembly with replacement rotators is in reverse order.

Normally, the bearing mounts are held in place in the channels 14, 15 by friction. To preclude sliding in the channels, one or more roll pins 40 can be fitted in a press-fit in apertures 51, 52, 53 in the facing sides 12, 13 and bearing mounts 1, as seen in FIG 1.

Each base section 10, 11 also is provided with two reentrant channels 6, 7 and two grooves 8, 9, the latter being shaped to slidably accept and retain flanges 30, 31 of the link section 20 of the base. The apertures 3 in the link sections 20 of the base are sized to pass threaded bolts 4, the heads 4a of which engage reentrant flanges 21, 22 and can pass freely in channels 6, 7, and which receive nuts and washers 5a, 5b on the other side of the bracket attachment 35, which attaches to the ordering apparatus in a position to mount the module thereon as a guide wall thereof, as seen in FIGS. 3 to 7 of U.S. Pat. No. 4,976,343.

The flanges 30, 31 and reentrant flanges 21, 22 of the linking base section 20 position the base sections 10, 11 on the base section 20, with respect to each other and the rotator array, and hold the base sections together to complete the wall module frame. Having the base in two detachable sections 10, 11 in this way greatly increases the versatility and adaptability of the wall module.

To mount the wall module 23 on the ordering apparatus, one mounts the linking base section 20 to the bracket 35 via bolts 4 and nuts and washers 5a, 5b, which pass through apertures 3, and then slides the base section 20 onto the base sections 10, 11 with flanges 30, 31 in grooves 8, 9. The base sections 10, 11 with sides 12, 13 are then held in place on the base section 20. The rotators on shafts 27 are then attached to the bearing mounts 1 with ends 27a held tightly in sockets 28 in a press fit, and the array S1 then attached to the sides 12, 13 by sliding the bearing mounts 1 into channels 14, 15. This is easily done because the axle ends are so held to mounts 1 that the entire array, mounts, axles and rotators, constitute one rigid piece. The bracket can then be attached to the ordering apparatus.

To replace the rotators, it is not necessary to disassemble the entire module. One need only slide out the bearing mounts 1, for access to and replacement of the rotators on their shafts 27.

The drive system for the stands S1 can be as shown in U.S. Pat. No. 4,976,343 and can include main drive pulley made of aluminum (anodized), and covered with a vulcanized USDA grade synthetic rubber material, a flat drive belt, made of a USDA approved synthetic rubber material, with a "v" guide molded thereto, a shaft, a bearing and a drive motor.

Figure 4:
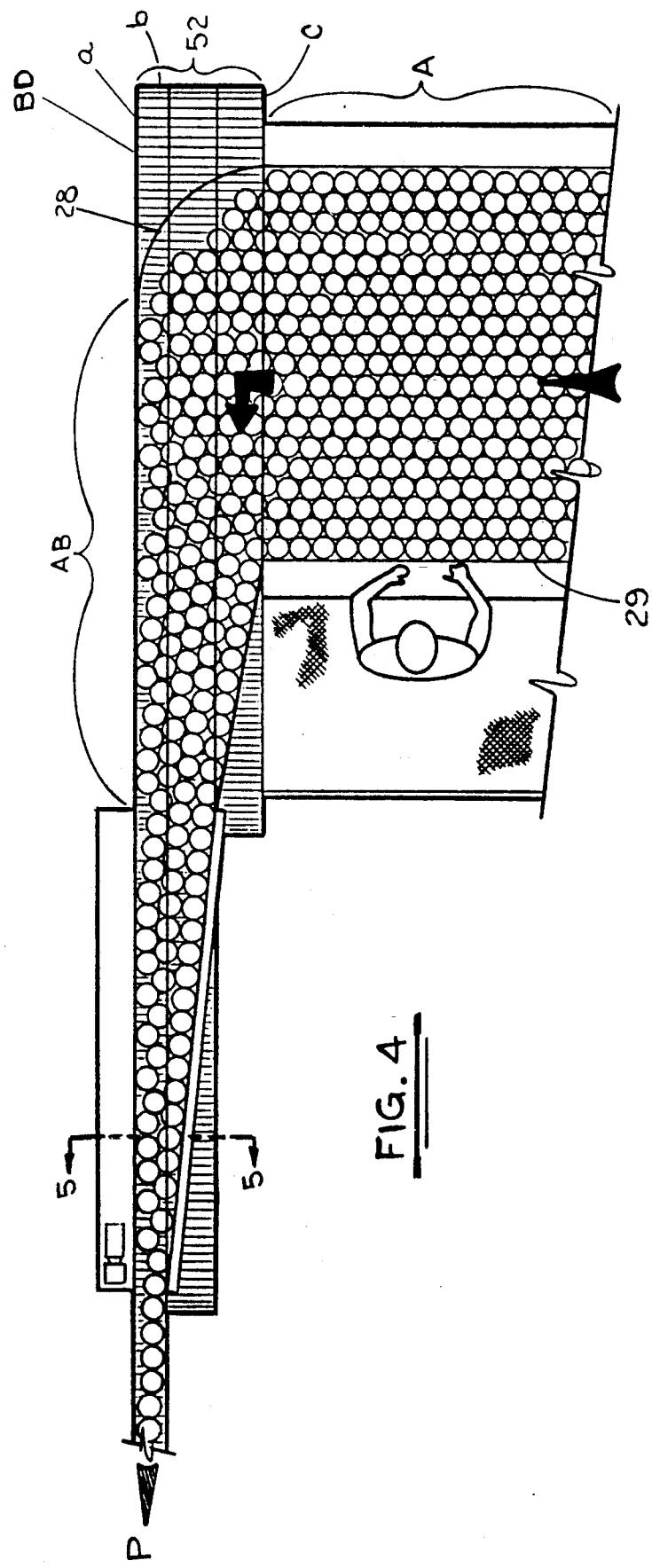
FIG. 4 is a plan view of an ordering apparatus incorporating a wall module of FIG. 1, provided with polygonal rotators.

The assembly incorporating the wall module is best seen in FIG. 4. A bulk depalletizer BD feeds cylindrical bottles B or similar articles from the loading area A to the accumulation or collection area AB. This bulk depalletizer BD has a motor-driven conveyor 52, and is capable of feeding up to 2,200 bottles B per minute into the production system P. These bottles B are moved by the bulk depalletizer BD from area A onto the cross-conveyor, three belts 52a, 52b, 52c, into area AB. The area AB has restraining walls 28, 29, which confine the bottles as they are moved to the left by the conveyors 52, as illustrated by the arrow, and thus are forced into the convergent area C to order themselves into a single file at D. Within portions of areas C and D and abutting the ends of the restraining walls 28, 29 are positioned guide walls 23 and 24 in accordance with the invention, made up of stands S1, S2, best seen in FIGS. 5, 5a, of driven and freely rotatable polygonal rotators. The stands S1 are rotated by a power source (not shown). The stands S2 are not driven, but are freely rotatable.

The rotators of FIGS. 5 and 5a are in pairs of two hub types keyed by the hub flange portion to retain them when adjacent in the desired nonaligned orientation. They are of molded plastic, but they can also be metal, and are hexagonal. Hubs 25 have central apertures for rotatable mounting to a shaft such as 27 in FIG. 5. One hub of each pair has a flange 42 mating with an opposite flange 43 of the other hub of the pair. The oppositely flanged hubs when in abutting position key the rotators in the orientation shown with corners of each projecting beyond sides of adjacent rotators. The hubs and flanges retain the rotators in the orientations shown when the shafts 27 are driven, or when the rotators are free to rotate on the shafts when in contact with rotative articles.

In operation, as seen on U.S. Pat. No. 4,976,343, the bottles in random arrangement are carried from areas A, B on the conveyors into the convergent ordering area C, where they encounter guide wall modules 23 and are rotated by the driven rotating stands S1 of rotators in wall 23. The rotating bottles in contact with the stands at 23 in turn rotate bottles with which they are in contact away from the wall, and the rotating movement is thus transmitted by the bottles all the way across area C to the stands of the opposite wall, which then begin to rotate, since they are freely rotatable. At the same time, the stands of the walls, due to the projecting corners of adjacent rotators, impart an irregular vibratory movement to the bottles, also transmitted but with diminishing force from each wall towards the center of area C. This rotational and vibratory movement facilitates ordering of the bottles into a single file by the time the bottles reach area D. In the course of this convergence all of the bottles are gradually shoved along the conveyor into the single file.

Having regard to the foregoing disclosure, the following is claimed as the inventive and patentable embodiments thereof:

1. A guide wall module for apparatus for ordering a flow of randomly arranged cylindrical articles on a conveyor surface into a single file leading to an article single file portion of the apparatus, comprising:
   (1). an array composed of:
      (i) a plurality of rotators;
      (ii) arranged for rotation on axles having ends extending beyond the rotator array thereon;
      (iii) the rotator array being disposed in a substantially vertical stand of superimposed rotators;
   (2) a frame formed in a U-configuration having a base and facing sides extending outwardly from the base, the facing sides being sufficiently spaced apart to receive and retain the array therebetween at a point sufficiently far from the base to allow free rotation of the rotators;
      (i) the facing sides having opposed facing longitudinal channels slidably receiving and retaining bearing mounts for rotatably supporting the axle ends of the array;
      (ii) the base having mounting means for attaching the wall module to the apparatus as a wall thereof in a position to contact cylindrical articles on the conveyor surface.

2. A guide wall module according to claim 1 in which the rotators are polygonal, and so oriented to each other in the stand that edges of some rotators project outwardly beyond side walls of other rotators in the stand for operative contact with cylindrical articles on the conveyor surface to rotate the cylindrical articles; whereby rotating polygonal rotators in the stands upon contact with cylindrical articles impart a vibrational movement to these articles while the articles are rotating and so inhibit jamming and blockages while the articles are moved and ordered into the single file.

3. A guide wall module according to claim 1 comprising power means for rotating the rotators in one direction so that the rotators rotate the articles in contact therewith in the opposite direction to the direction of rotation of the rotators.

4. A guide wall module according to claim 1 in which the rotators are mounted in stands for free rotation in the opposite direction to and upon contact with rotating articles moving along the guide wall module.

5. A guide wall module according to claim 1 in which each rotator comprises a hub portion having a central aperture and an irregular surface on each side of the hub interlocking with a corresponding mating surface on the hub of the adjacent rotator so as to maintain adjacent rotators in the stated relationship, and a central axle supporting the stand of rotators in interlocking rotating relationship.

6. A guidewall according to claim 5 in which the irregular hub surfaces have raised and depressed portions.

7. A guide wall according to claim 6 in which the portions have straight sides.

8. A guide wall according to claim 6 in which the portions have curved sides.

9. A guide wall module according to claim 1 in which the rotators are polygonal.

10. A guide wall module according to claim 1 in which the rotators are spherical.

11. A guide wall module according to claim 1 in which the rotators are cylindrical.

12. A guide wall module according to claim 1 in which the axle ends are fixed to the bearing mounts and the rotators rotate on the axles.

13. A guide wall module according to claim 1 in which the axle ends are rotatable on the bearing mounts.

14. A guide wall module according to claim 1 in which the base is in three sections, a first facing side being a part of a first base section, a second facing side being a part of a second base section, and a third base section slidably mounted on and retaining the first and second base sections thereto.

15. A guide wall module according to claim 14 in which the first and second base sections each have longitudinal channels and flanges engaging and slidably retaining corresponding portions of the third base section.

16. A guide wall module according to claim 15 in which the longitudinal channels of the first and second base sections also slidably receive flanged ends of attaching means on the mounting means so as to permit location of the mounting means at a selected position on the third base section.

* * * * *